May 2, 1967 S. A. BULIN 3,316,695
AGRICULTURAL IMPLEMENT
Filed April 27, 1964 3 Sheets-Sheet 1

INVENTOR.
SHELLY A. BULIN.
BY
Emerson B Donnell ATTY.
Robert O. [Ireland] AGT.

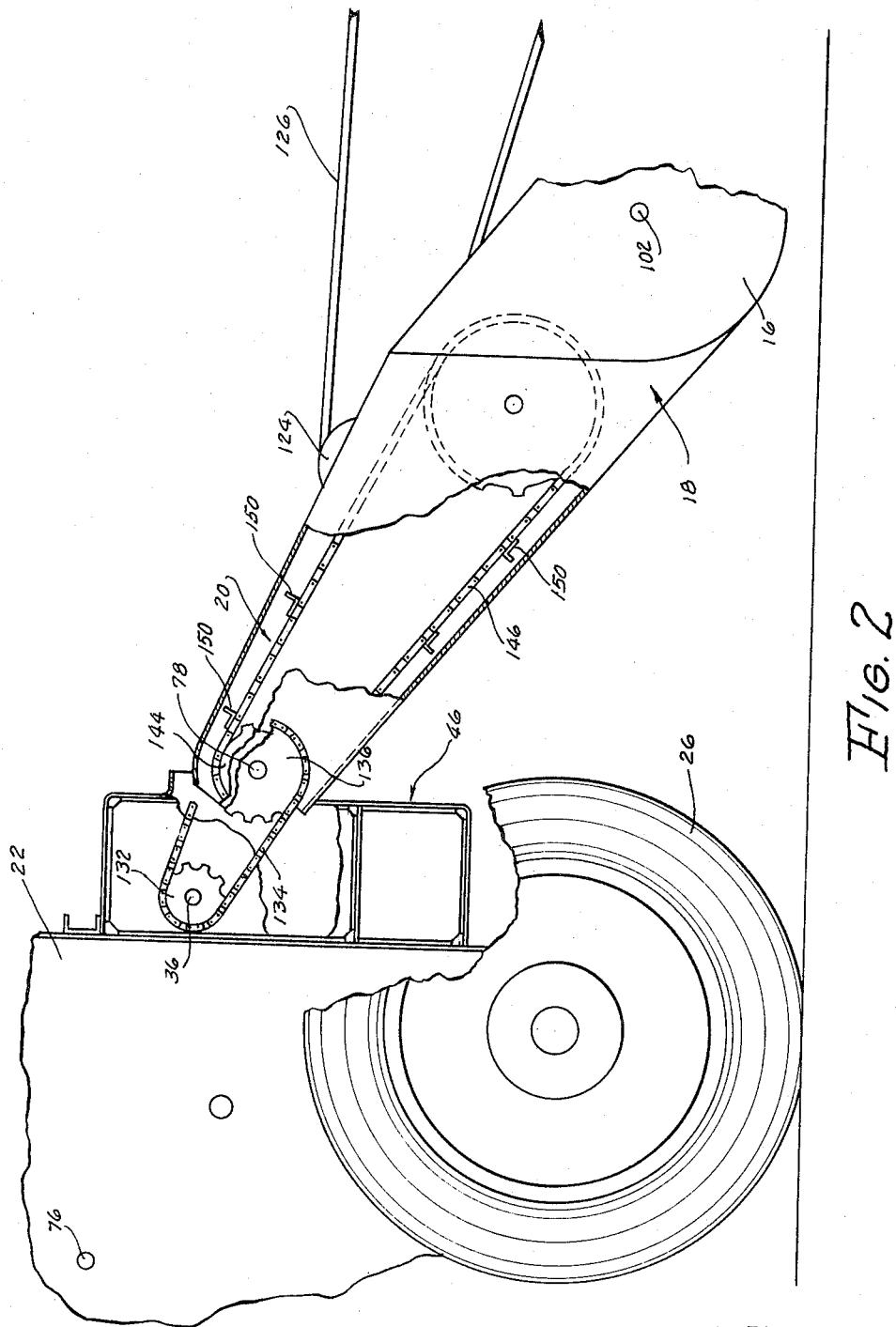

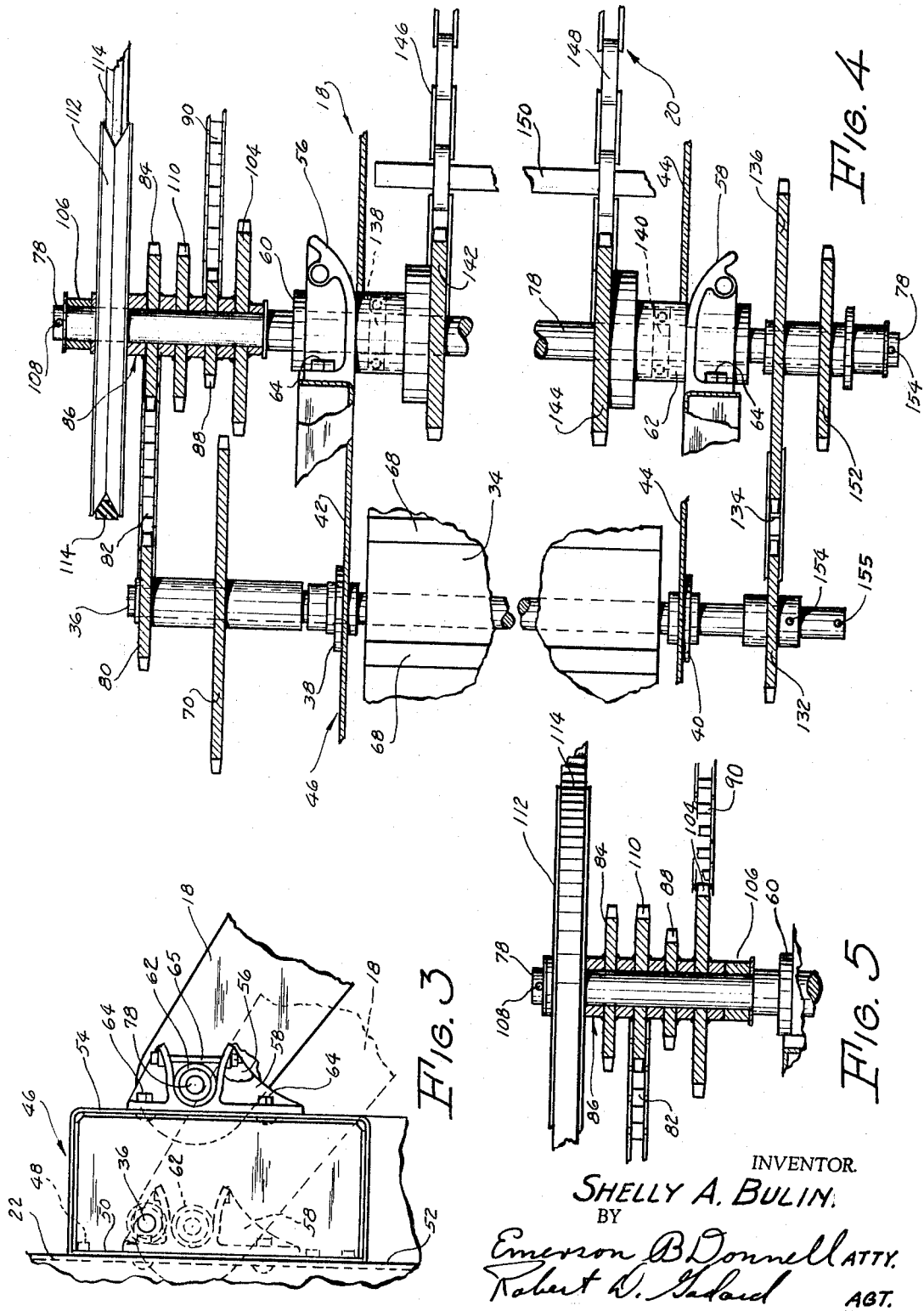

United States Patent Office 3,316,695
Patented May 2, 1967

3,316,695
AGRICULTURAL IMPLEMENT
Shelly A. Bulin, Davenport, Iowa, assignor to J. I. Case Company, Racine, Wis., a corporation of Wisconsin
Filed Apr. 27, 1964, Ser. No. 362,695
2 Claims. (Cl. 56—21)

The present invention relates to feeding the threshing cylinder of a combination harvester-thresher, and particularly such feeding under special conditions wherein difficulties have been encountered.

While the improvements to be described will be found advantageous under a variety of crop conditions, they are particularly valuable in the operation of threshing the seeds from defoliated alfalfa. In this crop, the straw is commonly very long, on the order of six feet, and there is difficulty in feeding the cylinder evenly with such a large volume of straw. Severe slugging is likely to occur which seriously overloads the drives to the various components, particularly the cylinder, so much so as to substantially shorten the life of these parts.

As stated, the straw is very long, and furthermore, the seed is easily shaken out of the heads inadvertently by the handling of the straw before it reaches the threshing cylinder. This seed when recovered brings a very high price, so any loss of this nature is a serious matter.

In general, the requirements for gentle and even feeding are satisfied by controlling the speeds of the feeding components, and particularly by operating them at considerably slower speeds than is desirable for other crops.

Another feature which makes the harvesting of such crops practical is the use of a beater in a position where it will ease the feeding of long straw into the bite of the cylinder with a minimum of bending thereof, and the principal object of the invention is to provide feeding means for a combine threshing mechanism which will handle the long straw of defoliated alfalfa in a gentle manner, to avoid losing any appreciable quantity of valuable seeds, and which will feed the straw in an even and continuous manner so as to avoid slugging and overloading of the drive mechanism, particularly that leading to the cylinder.

A further object is to provide such a device in the form of an attachment which can be applied to an existing machine and which, when so applied, will make the machine amply capable of threshing alfalfa seed and feeding the straw smoothly and evenly, and which attachment, when applied to such existing machine, will add to it the capability of adjusting the speed of the feed rake, reel and header auger, to suit the requirements of this, or for that matter, of any similar crop which is easily threshed but which involves a large volume of long straw.

The manner in which these objects are accomplished is fully set forth in the following specification and accompanying drawings, in which:

FIG. 2 is a similar view of the right side of the machine;

FIG. 3 is an enlarged right side elevation of a fragment of the machine with parts removed showing a header attaching means;

FIG. 4 is an enlarged plan view with parts broken away showing certain drive mechanism indicated in FIGS. 1 and 2; and FIG. 5 is a similar view of a portion of FIG. 4, showing parts in a different position.

Similar reference characters have been applied to the same parts throughout the drawings, and the following specification.

Figure 1:
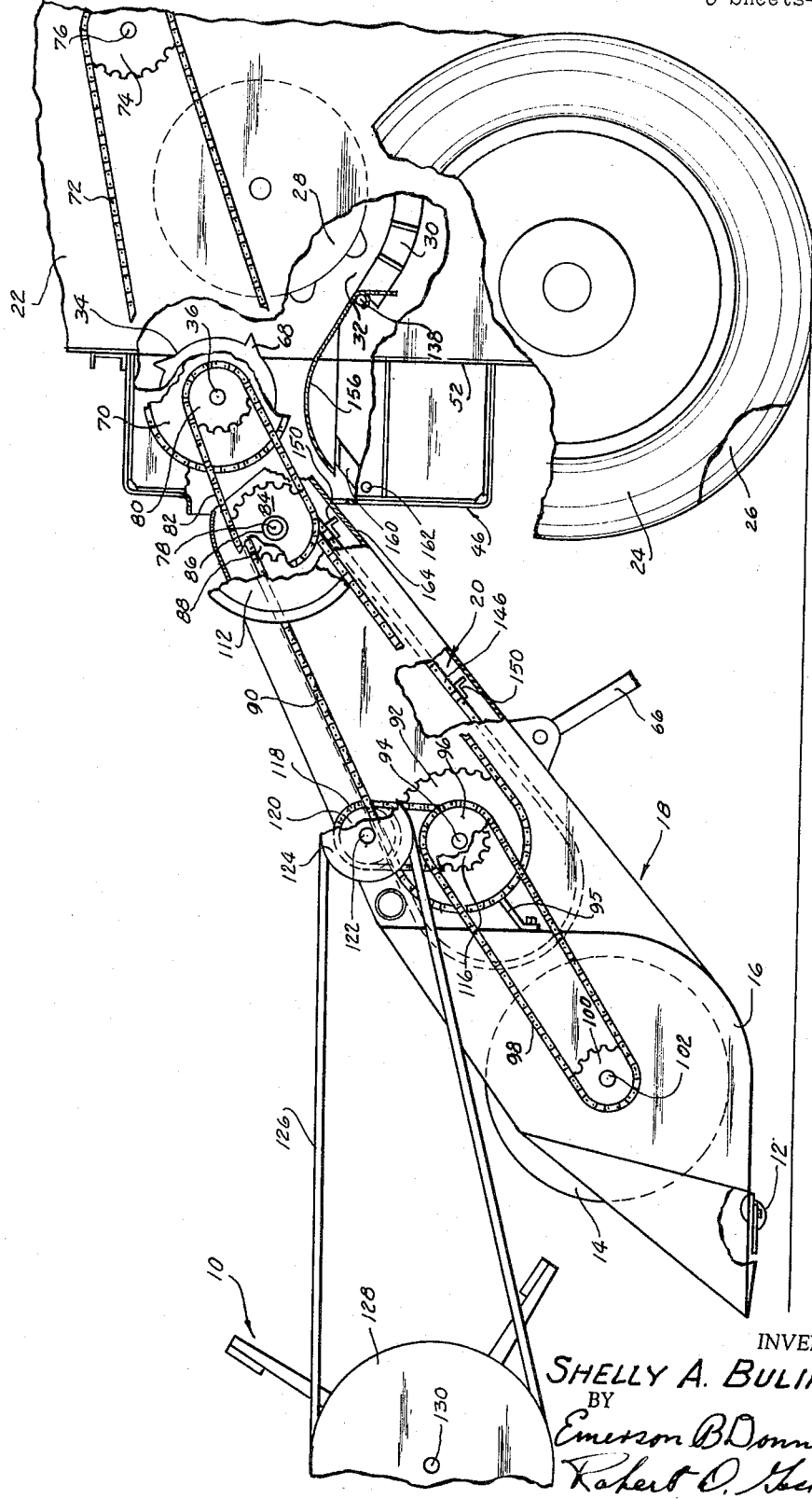
FIG. 1 is a fragmentary left side elevation of so much of a machine involving the invention as necessary for an understanding thereof, with parts broken away to show what lies beneath.

The invention is in the nature of an attachment for a combination harvester-thresher for improving the efficiency under certain difficult conditions, and the machine with which the attachment would be used would include a reel 10, FIG. 1, a sickle or cutter bar 12, an auger conveyor 14, arranged in an auger trough 16 to which is rigidly attached a feeder housing 18. Within feeder housing 18 is an endless chain type of feed rake 20, the parts so far described being well known and constituting the harvester part of the assembly. Feeder housing 18, in the conventional arrangement, is pivotally secured to a thresher housing 22 which is carried on traction wheels 24 and 26, housing 22 having journaled therein a threshing cylinder 28 which operates in connection with a concave 30 to thresh crop material presented to the bite or narrowing entrance space 32 between cylinder 28 and concave 30. The material is drawn in by the rotation of cylinder 28 and threshed in its passage between the cylinder and concave, being then passed on to the separating mechanism in housing 22 in conventional manner, not necessary to show and describe.

The difficulty which has been experienced is that, with such long and bulky straw as dealt with in threshing defoliated alfalfa for example, the straw tends to be drawn in too fast, and in an uneven manner. Under these conditions, the straw is apt to go in, in large bunches or "slugs," the overloading effect causing momentary extraordinary demands for power, far beyond the load capacity of the usual drive mechanism. Furthermore, the position of the conventional feeding mechanism in relation to the cylinder causes a sharp change in direction at the upper end of the feeding means, which appears to tend to cause a drag on the rotation of the cylinder, much as a brake would do. This condition further increases the demand for power merely to run the cylinder.

Such combines are usually self-propelled and the power plant is adequate to supply the demand, but the mechanism for transmitting the power to the cylinder is not designed for such loads, the strength which would be required being entirely unnecessary under the usual conditions of operation. As a result, the drive to the cylinder is badly over-stressed when treating crops of the nature of defoliated alfalfa, and, while it may not fail immediately, its useful life will be reduced to an unacceptable degree. To avoid these disadvantages, it is necessary to smooth the delivery of material to the cylinder; while to reduce the loss of seeds, it has been found that a substantial reduction in the speeds of the reel, auger, and feed rake, as compared with the usual rates of these parts, is very effective.

For the purpose of smoothing the delivery of the crop material to the cylinder 28, a rotating beater 34 is mounted on a shaft 36, FIGS. 3 and 4, journaled in suitable bearings 38 and 40 fixed in the walls 42 and 44 of an auxiliary housing, generally designated as 46.

Housing 46 is interposed between feeder housing 18 and thresher housing 22. It is held in place in any suitable manner, as by bolts 48 engaged with flanges 50, and with the front wall 52 of thresher housing 22, and has fixed to its front wall 54, a pair of forwardly open socket members or "bull horns" 56 and 58 which are spaced apart, and receive between them above-mentioned feeder housing 18. Housing 18 has fixed thereon, opposed coaxial sleeves 60 and 62, and which are normally engaged with the bull horns so that feeder housing 18 is securely fastened to housing 54, but free to swing up and down about the axis of sleeves 60 and 62. Bull horns 56 and 58 are secured to wall 54 in any suitable manner, but preferably by bolts 64, and when the attachment constituting the present invention is not in use; or in other words, when housing 46 is not interposed between feeder housing 18 and thresher housing 22, bull horns 56 and 58 are removed from housing 46 and attached directly to the front wall 52 of thresher housing 22, as shown in dotted lines in FIG. 3.

The forwardly directed opening of each of bull horns 56 and 58 is closed by a removable bolt 65 which prevents undesired removal of sleeves 60 and 62 but permits the ready removal thereof, and of housing 18 when desired, merely by first removing bolts 65.

It will now be apparent that feeder housing 18 is carried directly on housing 22 at such times as the attachment is not needed. Any suitable or well-known mechanism 66 is contemplated for swinging the feeder housing up and down, and which forms no part of the invention, and has therefore not been further described.

Beater 34 has ribs 68 for engaging the crop material and is rotated by means of a sprocket 70, FIG. 1, fixed on shaft 36 and actuated by a chain 72 engaged with a sprocket 74 fixed on a shaft 76. Shaft 76 extends through the thresher housing 22 rearwardly and above cylinder 28 and is driven in any well-known manner from the combine engine, or other source of power, and commonly also carries and actuates a beater, not shown, for well-known purposes within housing 22.

When the attachment is not in use, shaft 76 drives a shaft 78 through sprocket 74, and a suitable chain and sprocket not shown, shaft 78 being the upper shaft of feed rake 20, and from which the drive is distributed to the other elements of the header. The manner in which this is done need not be further described, since the same or analogous parts are used when the attachment is in place, and which parts will now be described.

Shaft 36 carrying auxiliary beater 34, driven by above-mentioned sprocket 70 also has fixed therewith a sprocket 80 which drives, through a chain 82, a sprocket 84. Sprocket 84 is fixed on a sleeve 86, shown in more detail in FIG. 4, which is journaled on above-mentioned shaft 78 so that sleeve 86 may rotate independently of, and therefore, at different speeds than shaft 78. Sleeve 86 has fixed thereon, a sprocket 88 which drives, through a chain 90, a sprocket 92 fixed on a shaft 94, being the header jack shaft and extending from a point close to auger trough 16 and feeder housing 18 to the region of the left end of auger trough 16, and is supported from suitable bearings and brackets as 95 and which are well-known and form no part of the invention. Shaft 94 has a sprocket 96 fixed thereon which drives, through a chain 98, a sprocket 100 fixed on a shaft 102 constituting the main shaft or stem of auger 14. In this manner, auger 14 is driven from power source 76.

Turning to FIG. 4, it is to be noted that sprocket 88 is smaller than sprocket 84. Therefore, if sprocket 92 is the same sprocket as used without the attachment, it follows that sprocket 92 will run slower than it did before the attachment was applied, so that a reduced speed is attained in auger 14. A larger sprocket 104 is also fixed on sleeve 86, spaced from sprocket 88 and which may be aligned with chain 90 by shifting sleeve 86 axially along shaft 78. This is accomplished by removing the entire sleeve along with a spacer 106, which is easily done by first removing a pin 108 in shaft 78, and replacing the parts with spacer 106 at the right end of sleeve 86, as seen in FIG. 5.

It will be noted that sprocket 104 is larger than sprocket 88 so that, everything else being equal, sprocket 104 will drive sprocket 92 at a faster rate than would sprocket 88. This shift of sleeve 86 will align another sprocket 110 with sprocket 80 and chain 82, and chain 82 is then engaged with sprocket 110 instead with sprocket 84, as a part of the changeover operation. However, sprockets 84 and 110 are of the same size so that sleeve 86 will run at the same speed in the new situation as it did before. This is important because sleeve 86 also has fixed thereon a relatively large pulley 112 which actuates, through a belt 114 and suitable mechanism, not necessary to further describe, the sickle mechanism of cutter bar 12.

Many such sickle drive mechanisms are well known, the main requirement being that they run at a reasonably constant predetermined speed, and the particular details of the sickle drive mechanism beyond sleeve 86 are not considered part of the invention. However, the equipment of the sickle mechanism is met in that sprockets 84 and 110 will drive sleeve 86 at the same rate, regardless of the shifted position of sleeve 86 and the resulting speed of header jack shaft 94. Thus, it is possible to attain, by a relatively simple rearrangement of parts, a variation in the speed of auger 14. For work in defoliated alfalfa and such crops, the rotation of auger 14 may be substantially slowed without affecting the speed of action of the sickle mechanism.

It is to be understood that suitable or well-known expedients are supplied for maintaining suitable tension in chains 72, 82, 90, and 98, but which are well known and omitted to avoid complication of the drawings.

Shaft 94 has, inwardly of sprocket 96, a sprocket 116 which drives, through a chain 118, a sprocket 120 upwardly of sprocket 116 and fixed on a shaft 122 carried in suitable bearings supported from trough 16 in well-known manner. Shaft 122 has fixed thereon, a pulley 124 which drives, through a belt 126, a pulley 128 fixed on a shaft 130 constituting a main or center shaft of reel 10. Shaft 122 and therefore shaft 130 will rotate in proportion to the rotations of shaft 94, and it will therefore be apparent that changes in the speed of auger 14 will be accompanied by similar or proportional changes in the speed of reel 10. Therefore, when it is desirable to reduce the speed of the feeding expedients, this is accomplished by shifting above-mentioned sleeve 86 and re-arranging the chains as described.

Since the sickle mechanism is driven through pulley 112 and the relatively long belt, the belt will have sufficient tolerance to accommodate the shifting of sleeve 86 without difficulty. The speed of feed rake 20 is also adjustable in a somewhat analogous manner.

Turning to FIGS. 2 and 4, above-mentioned shaft 36 extends entirely through housing 46, and has on its right-hand end, a sprocket 132. Sprocket 132 drives through a chain 134 a sprocket 136 fixed on above-mentioned shaft 78. Shaft 78 is journaled in suitable bearings 138 and 140, carried respectively in sleeves 60 and 62, and has inwardly of bearings 138 and 140, and also inside of feeder housing 18, sprockets 142 and 144. Sprockets 142 and 144 propel chains 146 and 148 constituting a major part of feed rake 20, feed rake 20 also having a plurality of cross slats or impellers 150. As will be apparent, rotation of shaft 36 will drive shaft 78 and cause operation of feed rake 20. Shaft 78 has another sprocket 152 which is substantially smaller than sprocket 136, and sprocket 132 by the simple expedient of removing a pin 154, may be shifted axially of shaft 36 to a new position aligned with sprocket 152. If pin 154 is replaced in hole 155 and chain 134 is then installed on sprockets 132 and 152, since the speed of shaft 36 is predetermined and substantially constant, rake 20 will be run at a considerably faster rate than when sprocket 136 is in use. Therefore, it will be apparent that, with the changeable sprocket and chain positions, just explained, reel 10, auger 14, and feed rake 20 will all be operated at a relatively slow speed. However, if desired, these parts may be quickly and easily changed to run at conventional or what might be termed, standard speeds for use in more usual crop conditions without removing the attachment or making any substantial or difficult changes thereon.

While the slower speeds of the mechanism tend to hold back the heavy crop from being drawn too rapidly into the spaces between cylinder 28 and concave 30, or the "bite" of the cylinder, a further advantage is realized in the presence of auxiliary housing 46.

Beneath auxiliary beater 34 is a gently upwardly curved, or convex plate 156 which is preferably hinged at 138 to the front portion of concave 30. Plate 156 is supported at its forward end on a bracket 160 which may be adjusted about a pin 162 to adjust plate 156 to a suitable position beneath beater 34. Plate 156 forms an approximate continuation of the lower wall 164 of the feeder housing 18 so that a body or mat of long straw moving upwardly over wall 164 is gently bent over plate 156 and beaten and combed quite thoroughly so as to be gradually and smoothly fed into the space 32 or bite of cylinder 28. In view of the relatively slow movement of feeder 20, the material is held firmly between cross bars 150 and wall 164, while beater 34 is given time to disintegrate and smooth out the mat so that a relatively thin and loose layer of material passes into the bite 32. In this way, bunches of slugs of crop material are prevented from finding their way into bite 32, and furthermore, there is no sharp bend of the mat of material in changing its direction from that of feeder housing 18 in feeding into bite 32. It is therefore a simple matter to drive the combine at such a speed as will avoid overloading any part of the mechanism, and the long and heavy straw associated with the crop for which the attachment is designed will be fed smoothly and easily into the cylinder bite so that the latter and its driving mechanism will not be overloaded.

The operation of the mechanism is thought to be apparent from the foregoing description, it being evident that the material is directed into the sickle 12 by reel 10, conveyed by auger 14 to feeder rake 20 and fed over the gently, upwardly curved plate 156 where it is combed and separated by beater 34 and fed smoothly into the bite 32 of cylinder 28. It being commonly desirable to run the feeding mechanism at a largely reduced speed for the type of crop contemplated, the feed rake drive shaft 78 becomes also a countershaft for a speed reducing drive to jack shaft 94, auger 14 and reel 10, while shaft 36 of auxiliary beater 34 becomes a jack shaft for a reduced speed drive to feed rake drive shaft 78.

Beater 34 is contained along with plate 156, in its own auxiliary housing 46 which is relatively easily applied to the thresher portion of the combine, the usual sockets or "bull horns" for attaching feeder housing 18 being then placed on the front of auxiliary housing 46 instead of in their usual position on the front of thresher housing 22.

Variations in the arrangements of the parts will no doubt occur to those skilled in the art, and it is to be understood that the invention is not intended to be taken as limited to the details shown and described, or in fact in any manner, except as defined in the following claims.

What is claimed as new and desired to be secured by Letters Patent of the United States is:

1. A combine including a
thresher housing, a
threshing cylinder journaled for rotation in the housing, a
concave supported in the thresher housing in position to cooperate with said cylinder, to provide a bite to receive crop material between said cylinder and said concave, a
header including a cutter bar, an auger conveyor, a feeder housing, and a feed rake in said housing positioned to propel crop material from said auger conveyor toward said bite and having a driven power input shaft, a power source, means for feeding crop material into said bite comprising an
auxiliary housing fixed to the thresher housing in a position enclosing said bite,
means on said auxiliary housing for attaching said feeder housing to said auxiliary housing in position to feed crop material into said auxiliary housing, a
beater in said auxiliary housing in position to receive crop material from said feed rake and to impel said crop material into said bite, said beater having a driving and driven shaft,
means connected with said power source and with said driving and driven shaft in driving relation thereto, a
sleeve journaled on said driven power input shaft, power transmission means connected to said driving and driven shaft and in driving relation to said sleeve, and
variable ratio driving means connected with said sleeve and in driving relation with said auger conveyor.

2. A combine including a
thresher housing, a
threshing cylinder journaled for rotation in the housing, a
concave supported in the thresher housing in position to cooperate with said cylinder, to provide a bite to receive crop material between said cylinder and said concave, a
header including a cutter bar, an auger conveyor, a feeder housing, and a feed rake in said housing positioned to propel crop material from said auger conveyor toward said bite and having a driven power input shaft, a power source, means for feeding crop material into said bite comprising an
auxiliary housing fixed to the thresher housing in a position enclosing said bite,
means on said auxiliary housing for attaching said feeder housing to said auxiliary housing in position to feed crop material into said auxiliary housing, a
beater in said auxiliary housing in position to receive crop material from said feed rake and to impel said crop material into said bite, said beater having a driving and driven shaft,
means connected with said power source and with said driving and driven shaft in driving relation thereto, a
sleeve journaled on said driven power input shaft, power transmission means connected to said driving and driven shaft and in driving relation to said sleeve,
variable ratio driving means connected with said sleeve and in driving relation with said auger conveyor, and
variable ratio power transmission means connected to said driving and driven shaft and to said driven power input shaft of said feed rake.

References Cited by the Examiner

UNITED STATES PATENTS

| | | | |
|---|---|---|---|
| 1,202,227 | 10/1916 | Sandifur | 74—217 |
| 1,962,223 | 6/1934 | White | 74—217 |
| 2,435,020 | 1/1948 | Scranton | 130—27 |
| 2,507,669 | 5/1950 | Heth | 130—27 |
| 2,705,961 | 4/1955 | Worrell et al. | 130—27 |
| 2,749,696 | 6/1956 | Innes | 56—21 |
| 2,762,185 | 9/1956 | Hyman et al. | 56—209 |
| 3,209,759 | 10/1965 | Collins et al. | 56—20 X |
| 3,247,855 | 4/1966 | Kepkay | 130—27 |

OTHER REFERENCES

New All-Crop Harvester, Allis-Chalmers, copyright 1936, p. 22.

ABRAHAM G. STONE, *Primary Examiner.*

ANTONIO F. GUIDA, *Examiner.*

P. A. RAZZANO, *Assistant Examiner.*